(12) United States Patent
Sarangdhar et al.

(10) Patent No.: US 9,606,853 B2
(45) Date of Patent: Mar. 28, 2017

(54) PROTECTING A MEMORY DEVICE FROM BECOMING UNUSABLE

(71) Applicant: Intel Corporation, Santa Clara, CA (US)

(72) Inventors: Nitin V. Sarangdhar, Portland, OR (US); Sudhakar Otturu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,345

(22) Filed: Mar. 28, 2014

(65) Prior Publication Data

US 2015/0278003 A1    Oct. 1, 2015

(51) Int. Cl.
*G06F 11/07* (2006.01)
(52) U.S. Cl.
CPC ........ *G06F 11/0787* (2013.01); *G06F 11/073* (2013.01); *G06F 11/0775* (2013.01)
(58) Field of Classification Search
None
See application file for complete search history.

(56) References Cited

U.S. PATENT DOCUMENTS

| | | | | |
|---|---|---|---|---|
| 6,523,092 B1 * | 2/2003 | Fanning | ................ | G06F 12/128 |
| | | | | 711/133 |
| 7,313,705 B2 * | 12/2007 | Turkboylari | .......... | G06F 21/575 |
| | | | | 713/169 |
| 8,856,789 B2 * | 10/2014 | Torrey | ................ | G06F 9/45558 |
| | | | | 718/1 |
| 2002/0199052 A1 * | 12/2002 | Moyer | .................. | G06F 13/364 |
| | | | | 710/113 |
| 2010/0306848 A1 * | 12/2010 | Gellerich | ................ | G06F 21/53 |
| | | | | 726/24 |
| 2014/0317737 A1 * | 10/2014 | Shin | ..................... | H04L 63/1408 |
| | | | | 726/23 |
| 2015/0112966 A1 * | 4/2015 | Tokuda | ..................... | G06F 9/50 |
| | | | | 707/718 |
| 2015/0161388 A1 * | 6/2015 | Margalit | ............... | G06F 21/554 |
| | | | | 726/23 |
| 2015/0186643 A1 * | 7/2015 | Tu | ........................... | G06F 21/53 |
| | | | | 726/23 |

FOREIGN PATENT DOCUMENTS

WO     2015/009306 A1 *  1/2015  ............. G06F 12/14

* cited by examiner

*Primary Examiner* — Christopher Revak
(74) *Attorney, Agent, or Firm* — Chapin IP Law, LLC

(57) ABSTRACT

In an embodiment, a computing device may include a memory device that may be rendered unusable after a certain number of operations are performed on the memory device. The computing device may incorporate one or more techniques for protecting the memory device. Processing logic contained in the computing device may be configured to implement the techniques. The techniques may include, for example, acquiring a request to write or erase information stored in a memory device contained in a first computing device, saving the request for execution after a user visible event has been generated on the first computing device, generating the user visible event on the first computing device, and executing the saved request after the user visible event has been generated. In addition, the techniques may include reporting the request. The request may be reported to, for example, an anti-malware agent.

23 Claims, 8 Drawing Sheets

PROTECTING A MEMORY DEVICE FROM BECOMING UNUSABLE

BACKGROUND

A computing device may use one or more storage systems to store information. The information may include, for example, data and/or executable instructions. The storage systems may include a primary storage, a firmware storage, and a secondary storage. A primary storage may be a storage that is directly accessible to a processor that may be contained in the computing device. The processor may access the primary storage via a memory bus that may contain provisions for transferring information between the processor and the primary storage. A firmware storage may be a storage that may be directly accessible to the processor. The processor may access the firmware storage via a bus that may contain provisions for transferring information between the processor and the firmware storage. A secondary storage may be a storage that may not be directly accessible to the processor. Here, information may be transferred between the processor and the secondary storage via one or more input/output (I/O) channels that may be part of an I/O bus.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
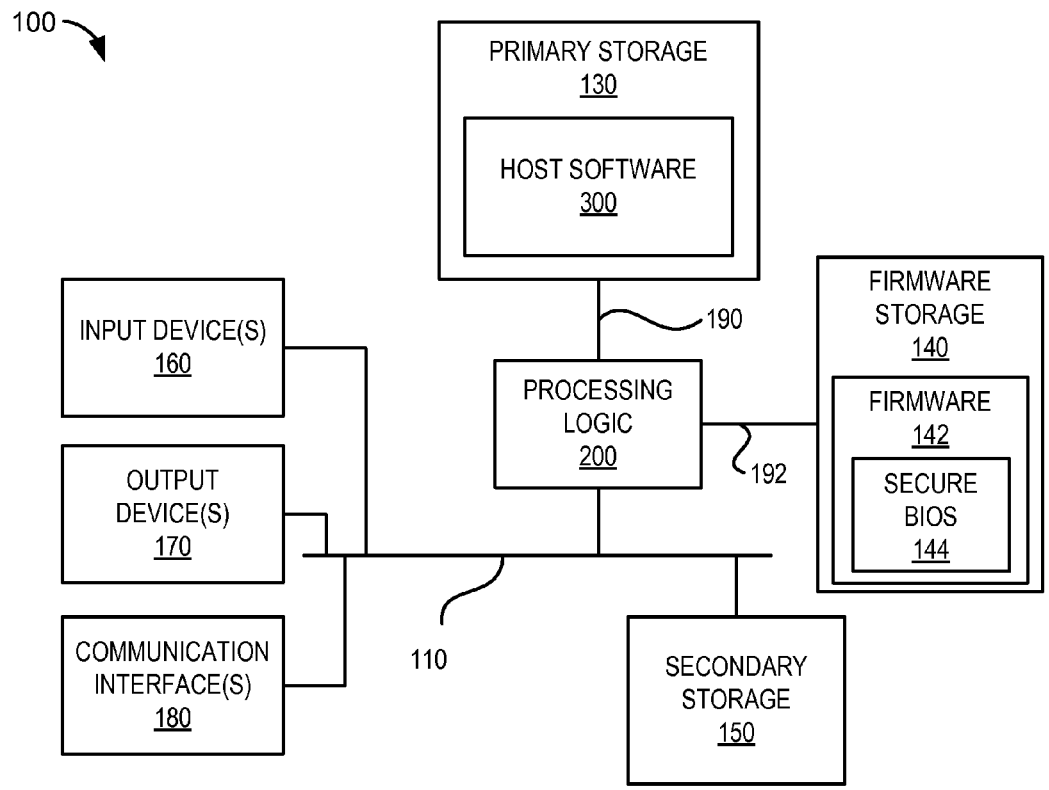
FIG. 1 illustrates a block diagram of an example embodiment of a computing device.

The following detailed description refers to the accompanying drawings. The same reference numbers in different drawings may identify the same or similar elements. Also, the following detailed description does not limit the invention.

A computing device may include, for example, processing logic and storage. The processing logic may include logic (e.g., hardware) for executing and/or manipulating information (e.g., data, computer-executable instructions) that may be stored in the storage. The information may include, for example, data and/or computer-executable instructions.

The primary storage may include one or more memory devices for storing the information. The primary storage may be, for example, volatile. A storage that is volatile may lose information stored in the storage when power is removed from the storage. The firmware storage may be non-volatile and may retain information in the storage when power is removed from the storage. A storage that is volatile may be referred to as a volatile storage and a storage that is non-volatile may be referred to as a non-volatile storage.

Some memory devices may allow a limited number of operations to be performed on the memory devices before the memory devices are considered no longer usable. For example, certain non-volatile memory devices may allow a limited number of write and/or erase operations to be performed on the non-volatile memory devices before the non-volatile memory devices may be considered no longer usable. This may be due to the non-volatile memory device wearing out and thereby losing its ability to store information. The non-volatile device may wear out due to being written and/or erased a certain number to times. For example, some non-volatile memory devices may be written or erased 100,000 times before the devices wear out and begin to lose their ability to store information. Thus, such devices may be considered unusable after 100,000 erase and/or write operations have been performed on the devices.

A computing device may incorporate a memory device that may allow a limited number of operations to be performed on the memory device before the memory device is considered to be no longer usable. In some situations, if software executing on the computing device performs the limited number of operations on the memory device, the computing device may be rendered unusable.

For example, suppose a computing device contains a flash memory device that allows a limited number of write operations to be performed on the flash memory device before the flash memory device becomes unusable. Further, suppose the flash memory device stores code (e.g., computer-executable instructions) that is executed when the computing device is booted. Now suppose after the computing device is booted, malware executing on the computing device maliciously performs the limited number of write operations on the flash device to render the flash device unusable. Since the flash device is rendered unusable, a later attempt to boot the computing device may fail and therefore may render the computing device unusable.

One or more techniques described herein may be used to protect memory devices that support a limited number of operations before being rendered unusable from being rendered unusable by, for example, malicious software such as malware. Techniques described herein may include, for example, techniques that may involve acquiring a request to write or erase information stored in a memory device contained in a computing device, saving the request for execution after a user visible event has been generated on the computing device, generating the user visible event on the computing device, and/or executing the saved request after the user visible event has been generated. The user visible event may include a reset of the computing device. The memory device may be contained in a storage that contains code that is executed by the computing device when the computing device is, for example, booted. Booting a computing device may include, for example, performing an initial set of operations on the computing device after the computing device is powered-on or reset.

Moreover, one or more of the techniques may involve reporting the event. The event may be reported to an anti-malware agent that may be executed by the computing device and/or a second computing device (e.g., a remote computing device). The second computing device may communicate with the computing device via, for example, a communications network.

One or more of the techniques may be implemented in a computing device that may incorporate memory devices to be protected. Computing devices that may implement one or more of the techniques may include, for example, smart phones, tablets, laptop computers, desktop computers, servers, embedded systems, and ultrabooks.

FIG. 1 illustrates an example embodiment of a computing device 100 that may implement one or more techniques described herein. Referring to FIG. 1, computing device 100 may include various components such as, for example, primary storage 130, processing logic 200, firmware storage 140, secondary storage 150, one or more input devices 160, one or more output devices 170, one or more communication interfaces 180, memory bus 190, firmware storage bus 192, and input/output (I/O) bus 110.

It should be noted that FIG. 1 illustrates an example embodiment of a computing device that may implement one or more techniques described herein and that other computing devices that may implement one or more techniques described herein may include more components or fewer components than the components illustrated in FIG. 1. Further, the components may be arranged differently than as illustrated in FIG. 1.

For example, a computing device that may implement one or more techniques described herein may have a portion of secondary storage 150 contained at a remote site that provides "cloud" storage. The site may be accessible to the computing device via a communications network such as, for example, the Internet. A communication interface 180 may be used to interface the computing device with the communications network.

Also, it should be noted that functions performed by various components contained in other of computing devices that may implement one or more techniques described herein may be distributed among the components differently than as described herein.

I/O bus 110 may be a bus that may enable communication among components in computing device 100 such as, for example, processing logic 200, secondary storage 150, one or more input devices 160, one or more output devices 170, and one or more communication interfaces 180. The communication may include, for example, transferring data and/or control signals between the components. Examples of busses that may be used to implement I/O bus 110 may include the serial AT attachment (SATA) bus, peripheral component interconnect (PCI) bus, PCI express (PCI-e) bus, universal serial bus (USB), small computer system interface (SCSI) bus, and the serial attached SCSI (SAS) bus.

Input devices 160 may include one or more devices that may be used to input information into computing device 100. These devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, or some other input device.

The information may include, for example, spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more devices that may output information from computing device 100. These devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, or some other output device.

Output devices 170 may be directed by, for example, processing logic 200, to output the information from computing device 100. Outputting the information may include presenting (e.g., displaying, printing) the information on an output device 170. The information may include, for example, text, graphical user interface (GUI) elements (e.g., windows, widgets, and/or other GUI elements), audio (e.g., music, sounds, speech), and/or other information that may be outputted by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G networks.

Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device that may be suitable for interfacing computing device 100 to a communications network.

Memory bus 190 may enable information, which may be stored in primary storage 130, to be transferred between processing logic 200 and primary storage 130. The information may include, for example, computer-executable instructions and/or data that may be executed, manipulated, and/or otherwise processed by processing logic 200.

Primary storage 130 may be a tangible non-transitory computer-readable storage that may be a primary storage for computing device 100. Primary storage 130 may store information that may be executed, manipulated, interpreted, and/or otherwise processed by processing logic 200. Primary storage 130 may include host software 300 which may include computer-executable instructions and/or data that may implement one or more techniques described herein. Details of an example embodiment of host software 300 will be described further below.

Secondary storage 150 may be tangible non-transitory computer-readable storage that may be a secondary storage for computing device 100. Secondary storage 150 may store information that may be executed, manipulated, interpreted, and/or otherwise processed by processing logic 200. The information may be stored, for example, on a storage device that may be contained in secondary storage 150.

Secondary storage 150 may be accessible to processing logic 200 via I/O bus 110. Secondary storage 150 may be include volatile and/or non-volatile storage devices.

Examples of storage devices that may be included in secondary storage 150 include magnetic disk drives, optical disk drives, random-access memory (RAM) disk drives, flash drives, thumb drives, SSDs, hybrid drives, and/or other devices that may be capable of storing information for computing device 100.

Information stored by secondary storage 150 may be stored on one or more non-transitory tangible computer-readable media contained in secondary storage 150. Examples of non-transitory tangible computer-readable media that may be contained in secondary storage 150 may include magnetic discs, optical discs, volatile memory devices, and or non-volatile memory devices.

Firmware storage bus 192 may enable information, which may be stored in firmware storage 140, to be transferred between processing logic 200 and firmware storage 140. The information may include, for example, computer-executable instructions and/or data that may be executed, manipulated, and/or otherwise processed by processing logic 200. An example of a bus that may be used to implement firmware storage bus 192 is the serial peripheral interface (SPI) bus.

Firmware storage 140 may be a tangible non-transitory computer-readable storage that may store various information for computing device 100. The information may be stored in one or more memory devices that may be contained in Firmware storage 140. The information may include, for example, firmware 142.

Firmware 142 may include computer-executable instructions that may be executed by processing logic 200 and may cause processing logic 200 to perform various acts. The acts may be associated with, for example, a basic input/output system (BIOS) for computing device 100, initialization of one or more portions of computing device 100, booting computing device 100, communicating with one or more portions of host software 300, secure BIOS 144, and/or bootstrapping various portions of host software 300 (e.g., an operating system (OS)) that may be executed by computing device 100.

Computer-executable instructions stored in firmware storage 140 may be stored in a code region of firmware storage 140. In addition or alternatively, information stored in firmware storage 140 may be stored in a data region of firmware storage 140.

Secure BIOS 144 may include computer-executable instructions that may be executed by processing logic 200 and may cause processing logic 200 to perform various acts. The acts may associated with, for example, controlling access to one or more memory devices that may be contained in firmware storage 140. For example, the acts may include acts that may be associated with enforcing policies that may be associated with writing and/or erasing information that may be stored in the memory devices.

Primary storage 130, firmware storage 140, and/or secondary storage 150 may include one or memory devices that may be used to store information. The memory devices may support, for example, serial or random access to information stored in the memory devices. A memory device that supports serial access to information stored in the memory device may be referred to as a serial memory device. A memory device that supports random access to information stored in the memory device may be referred to as a random access memory (RAM) device.

The memory devices may be, for example, volatile memory devices or non-volatile memory devices. A volatile memory device may be a memory device that may lose information stored in the memory device after power is removed from the memory device. A non-volatile memory device may be a memory device that may retain information stored in the memory device after power is removed from the memory device.

Memory devices that may be used in primary storage 130, firmware storage 140, and/or secondary storage 150 may include, for example, dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, phase change memory (PCM) devices, PCM and switch (PCMS) devices, nanowire-based devices, resistive RAM memory (RRAM) devices, and electrically erasable programmable ROM (EEPROM) devices.

Processing logic 200 may include logic for interpreting, executing, and/or otherwise processing information that may be stored in, for example, primary storage 130 and/or secondary storage 150. In addition, the information may include information that may be acquired (e.g., received) by one or more input devices 160 and/or communication interfaces 180.

Processing logic 200 may include a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process information. Processing logic 200 may comprise a single core or multiple cores. Examples of processors that may be included in processing logic 200 may include the Intel® Xeon® processor and Intel® Atom™ brand processors which are available from Intel Corporation, Santa Clara, Calif.

Figure 2:
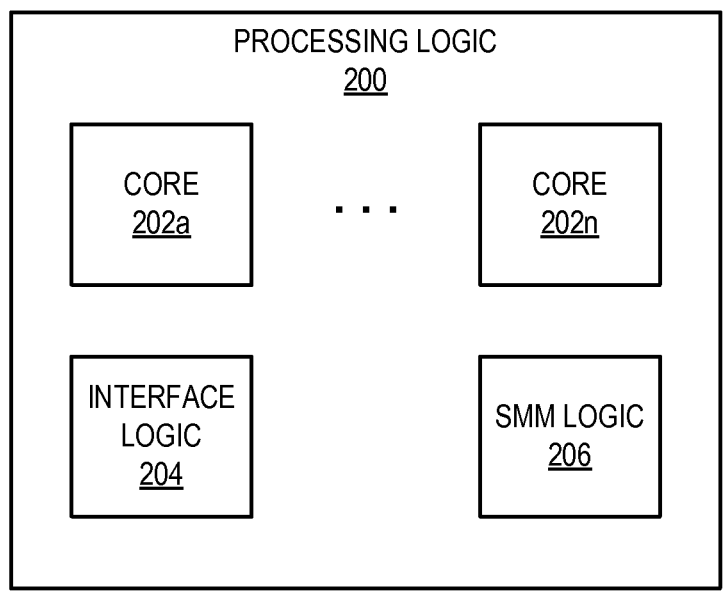
FIG. 2 illustrates an example embodiment of processing logic that may contained in a computing device.

FIG. 2 illustrates an example embodiment of processing logic 200. Referring to FIG. 2, processing logic may include various components such as, for example, one or more cores 202*a-n*, interface logic 204, and system management mode (SMM) logic 206.

Cores 202*a-n* may include logic that may implement one or more central processing units (CPUs). The logic may include logic that may execute computer-executable instructions and/or manipulate data that may be contained in, for example, primary storage 130 and/or firmware storage 140.

Interface logic 204 may include logic that may interface processing logic 200 with, for example, primary storage 130 and/or firmware storage 140. The logic may include, for example, memory controller logic that may be used to access information contained in, for example, primary storage 130 and/or firmware storage 140.

Interface logic 204 may also include logic that may interface processing logic 200 with various components attached to I/O bus 110 such as, for example, input devices 160, output devices 170, communication interfaces 180, and/or secondary storage 150. The logic may include logic that may enable processing logic 200 to communicate with the components and exchange information with the components via bus 110.

SMM logic 206 may include logic that may, inter alia, implement a system management mode for processing logic 200. The system management mode may be a special mode of operation for processing logic 200 where computer-executable instructions executed by the processing logic 200 are executed in a high-privileged mode. An computer-executable instruction that is executed in a high-privileged mode may have access to resources in computing device 100 that would not normally be accessible to the instruction if the instruction were executed at a lower privileged mode.

SMM logic 206 may also include logic that may require instructions that perform certain operations on memory devices contained in firmware storage 140 to execute in the high-privilege mode. These operations may include, for example, writing and/or erasing information contained in the memory devices.

Figure 3:
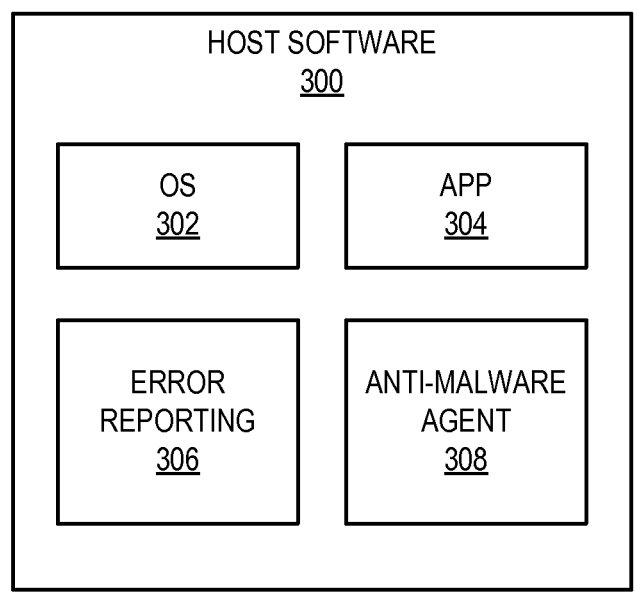
FIG. 3 illustrates an example embodiment of host software that may be executed by a computing device.

As noted above, primary storage 130 may include host software 300. FIG. 3 illustrates an example embodiment of host software 300. Referring to FIG. 2, host software 300 may include various components such as, for example, an OS 302, an application (APP) 304, an error reporting component 306, and an anti-malware agent 308.

OS 302 may be a conventional operating system that may implement various conventional operating system functions. These functions may include, for example, (1) scheduling one or more portions of APP 304 to run on (e.g., be executed by) the processing logic 200, (2) managing primary storage 130, and/or (3) controlling access to various components (e.g., input devices 160, output devices 170, communication interfaces 180, secondary storage 150) in computing device 100 and information received and/or transmitted by these components.

Examples of operating systems that may be used to implement OS 302 may include the Linux operating system, Microsoft Windows operating system, the Symbian operating system, Mac OS operating system, iOS operating system, Chrome OS. and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 8.1, Microsoft Windows 8, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS and iOS operating systems are available from Apple, Inc., Cupertino, Calif. The Chrome OS and Android operating systems are available from Google, Inc., Menlo Park, Calif.

APP 304 may be a software application that may include computer-executable instructions that may be executed by processing logic 200. The instructions when executed may perform acts that may be associated with functions provided by the software application.

Error reporting 306 may include computer-executable instructions that may be executed by processing logic 200. The instructions when executed may perform acts that may be associated with, for example, reporting attempts to access memory devices that may be contained in firmware storage 140. Secure BIOS 144 may enforce policies associated with accessing (e.g., writing, erasing) memory devices in firmware storage 140. Error reporting 306 may, for example, report violations of those policies. The violations may be reported, for example, to anti-malware agent 308.

Anti-malware agent 308 may include computer-executable instructions that may be executed by processing logic 200. The instructions when executed may perform acts that may be associated with, for example, detecting and/or reporting suspicious behavior that may be associated with accessing memory devices contained in firmware storage 140.

Figure 4:
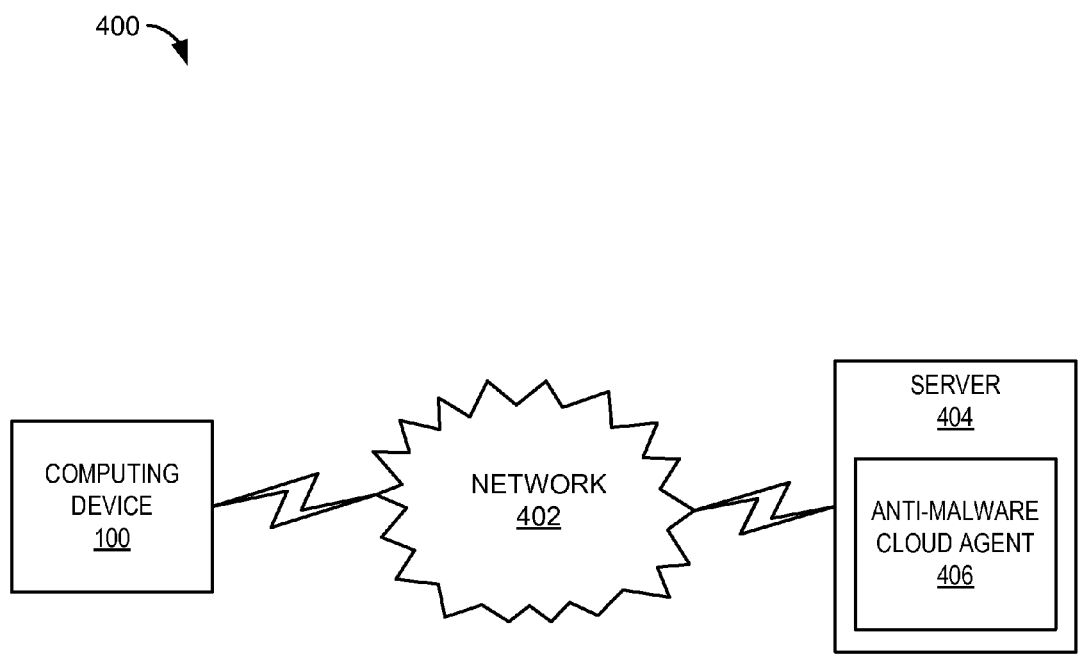
FIG. 4 illustrates an example embodiment of a distributed environment.

Computing device 100 may part of a distributed environment. FIG. 4 illustrates an example of a distributed environment 400 that may include computing device 100. Referring to FIG. 4, distributed environment 400 may include various components such as, for example, computing device 100, network 402, and server 404.

Computing device 100 may interface with network 402 via a communications interface 180. The communications interface 180 may be used to exchange information between computing device 100 and server 404 via network 402.

Server 404 may be a computing device that may include processing logic that may execute computer-executable instructions to perform various acts. These instructions may include instructions that may perform acts associated with anti-malware cloud agent 406. Examples of acts that may be performed by anti-malware cloud agent 406 will be described further below.

Server 404 may include a communications interface such as, for example, communications interface 180. The communications interface may enable server 404 to interface with network 402 and exchange information with computing device 100 via network 402.

Network 402 may include a communication network capable of exchanging information between entities (e.g., nodes) in the network 402. The information may be encapsulated in one or more packets that may be used to transfer the information between through the network 402. The information may be exchanged between entities using various network protocols, such as, for example, the Internet Protocol (IP), Asynchronous Transfer Mode (ATM), Synchronous Optical Network (SONET), the User Datagram Protocol (UDP), Transmission Control Protocol (TCP), and the Institute of Electrical and Electronics Engineers (IEEE) 802.11 protocol.

Network 402 may comprise various devices such as, for example, gateways, routers, switches, firewalls, servers, repeaters, and address translators. Portions of network 402 may be wired (e.g., using wired conductors, optical fibers) and/or wireless (e.g., using free-space optical (FSO), radio frequency (RF), acoustic transmission paths). Portions of network 402 may include a substantially open public network such as, for example, the Internet. Portions of network 402 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

Figure 5:
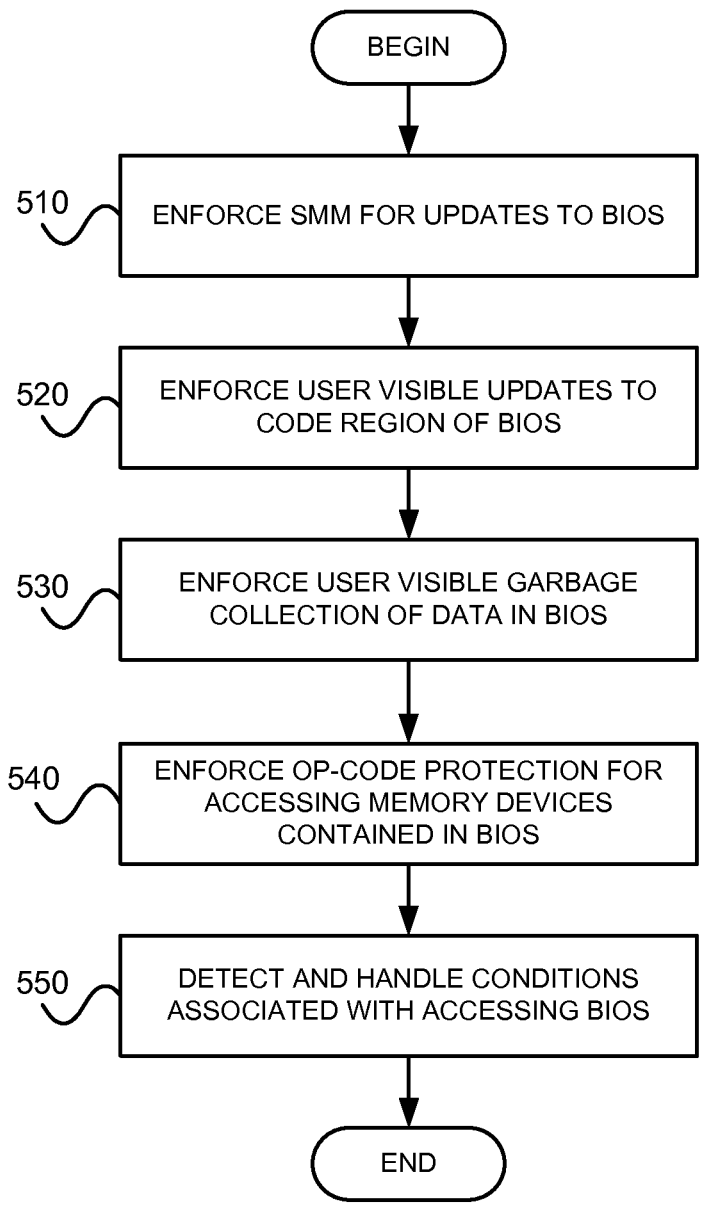
FIG. 5 illustrates a flow diagram of example acts that may be performed to prevent a memory device from becoming unusable.

FIG. 5 illustrates a flow diagram of example acts that may be performed to prevent a memory device in firmware storage 140 from becoming unusable. Referring to FIG. 5, at block 510, SMM updates for firmware storage 140 may be enforced. For example, SMM logic 206 (FIG. 2) may include logic that may allow certain operations to be performed on one or more memory devices contained in firmware storage 140 when processing logic 200 is in a system management mode. These operations may include, for example, operations that may involve writing information to the memory devices and/or erasing information contained in the memory devices.

At block 520 user visible updates to the code region of firmware storage 140 may be enforced. User visible updates may include, for example, generating a user visible event when the code region of the firmware storage 140 is updated. For example, secure BIOS 144 may include logic that may enforce various policies with respect to accessing firmware storage 140. These policies may include a policy that may define when a code region of firmware storage 140 may be updated.

Specifically, the policy may limit writing and/or erasing memory devices contained in the code region of firmware storage 140 to a time when computing device 100 is booting. At certain times while computing device 100 is booting, instructions executed by processing logic 200 may be restricted to instructions contained in the code region of firmware storage 140. These instructions may include instructions that may write and/or erase the code region of firmware storage 140 based on, for example, saved requests (described further below). Thus, the policy in conjunction with other policies and/or actions (also described further below) may ensure that the code region of firmware storage 140 is being written and/or erased by trusted code contained in the firmware storage 140 and not by untrusted code that may be contained, for example, in malicious software.

Booting computing device 100 may cause various user visible events. For example, booting computing device 100 may provide a visual and/or audio indication on an output device 170 that the computing device 100 is booting. In this example, by limiting writing and/or erasing to memory devices contained in the code region of firmware storage 140 to when the computing device 100 is booting, error reporting 306 may enforce user visible updates to the code region of firmware storage 140.

At block 530, user visible garbage collection of data in firmware storage 140 may be enforced. For example, garbage collection of data in firmware storage 140 may involve writing and/or erasing one or more memory devices that may be contained in the data region of firmware storage 140. Secure BIOS 144 may include logic that may enforce various policies with respect to performing garbage collection of data contained in firmware storage 140. These policies may include a policy that may define when garbage collection may be performed. For example, the policy may limit garbage collection of data in firmware storage 140 to a time when the computing device 100 is booted. As noted above, booting computing device 100 may cause various user visible events. Thus in this example, by limiting garbage collection of data in firmware storage 140 to when the computing device 100 is booted, secure BIOS 144 may enforce user visible updates to garbage collection of data region in firmware storage 140.

At block 540, operation code (op-code) protection for accessing memory devices in firmware storage 140 may be enforced. For example, secure BIOS 144 may include logic that may enforce various policies with respect to certain types of operations that may be performed on memory devices contained in firmware storage 140. These operations may include, for example, limiting a number of blocks in the memory devices that may be written and/or erased by a single operation.

At block 550, conditions associated with accessing firmware storage 140 may be detected and handled. For example, error reporting 306 may include logic that may detect whether a particular policy associated with accessing firmware storage 140 has been violated and report the violation to anti-malware agent 308. Anti-malware agent 308 may report the violation via network 402 to anti-malware cloud agent 406. Anti-malware cloud agent 406 may alert a user of the violation. The user make take an appropriate action to handle the violation. Alternatively or additionally, anti-malware cloud agent 406, anti-malware agent 308, and/or error reporting 306 may include code that may handle the violation.

In another example, secure BIOS 144 may include logic to enforce a policy that may allow memory devices that may store the data portion of firmware storage 140 to be written and/or erased a certain number of times within a certain time span. Here, if error reporting 306 detects that the policy is being violated (e.g., the memory devices are being written and/or erased too often), error reporting 306 may report the violation as described above.

Figure 6:
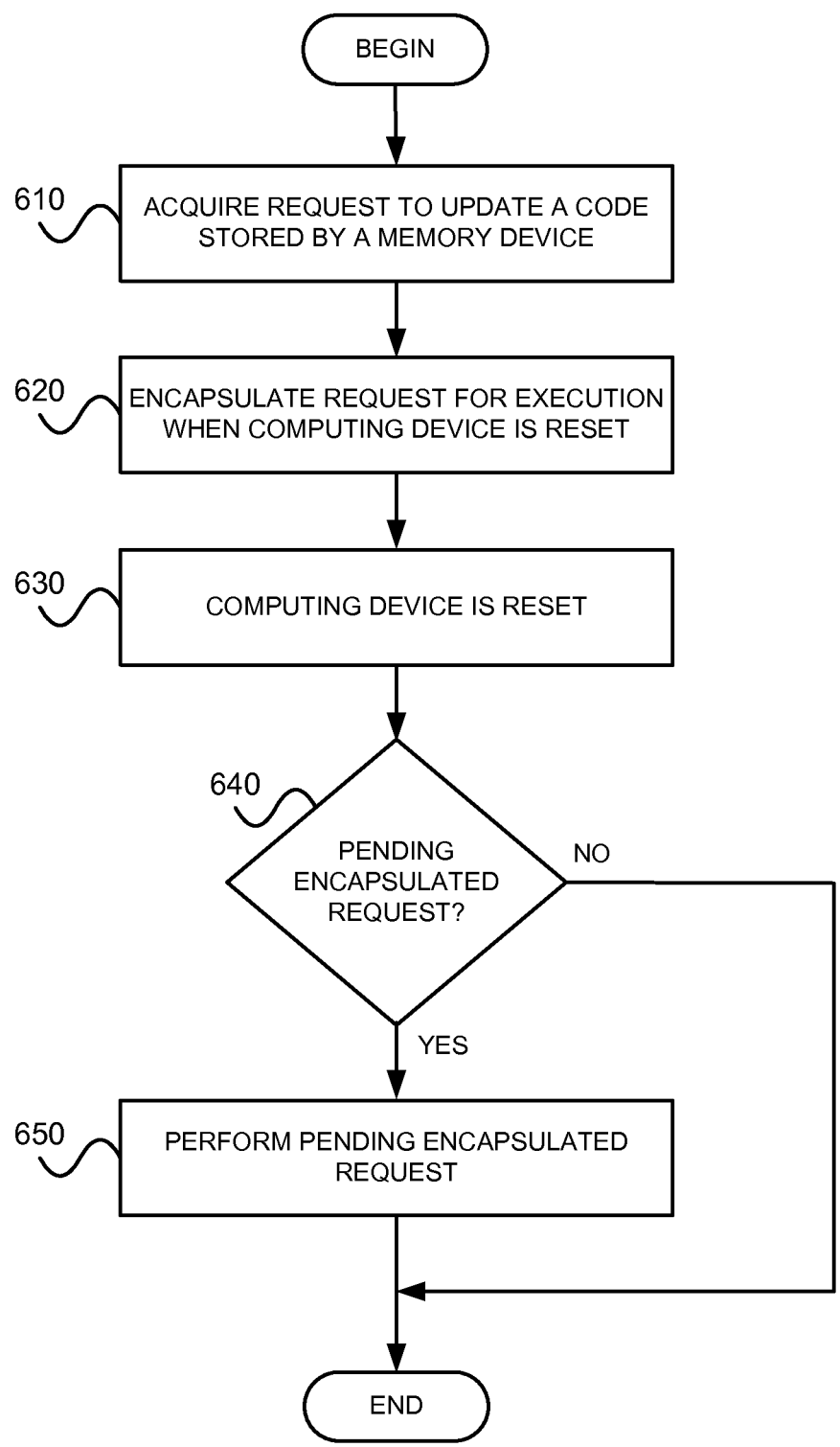
FIG. 6 illustrates a flow diagram of example acts that may be performed to handle a request to update code stored in a memory device.

FIG. 6 illustrates a flow diagram of example acts that may be performed to update the code region of firmware storage 140. Updating the code region of firmware storage 140 may include, for example, writing and/or erasing one or more memory devices, contained in firmware storage 140, that may store information in the code region.

Referring to FIG. 6, at block 610, a request to update the code region in firmware storage 140 may be acquired and, at block 620, the acquired request may be encapsulated (e.g., saved) for later execution when computing device 100 is reset. For example, the request may be acquired from OS 302 and/or APP 304 by secure BIOS 144. After acquiring the request, secure BIOS 144 may encapsulate the request. Encapsulating the request may include, for example, saving the request for later execution. Here, saving the request for later execution may include, for example, saving the request for execution after a user visible event occurs on the computing device (e.g., the computing device is reset). Saving the encapsulate request for later execution may cause the encapsulated request to be considered a pending encapsulated request.

At block 630, computing device 100 may be reset. Resetting computing device 100 may cause computing device 100 to, for example, begin executing computer-executable instructions contained in firmware storage 140. These instructions may be associated with performing various functions associated with booting computing device 100.

At block 640, a check is performed to determine whether an encapsulated request is pending. The check may be performed, for example, as one of the functions associated with booting computing device 100. If an encapsulated request is pending, at block 650, the pending request is performed. Here, for example, the pending request may be performed as one of the functions associated with booting computing device 100.

For example, suppose the acquired request includes writing a code region contained in firmware storage 140. Further, suppose the acquired request is encapsulated by secure BIOS 144 as described above. Now suppose computing device 100 is reset. Resetting computing device 100 may cause computing device 100 to execute one or more computer-executable instructions contained in firmware storage 140. The executed instructions may perform a check to determine that the encapsulated request is pending. The executed instructions may also may perform the pending encapsulated request. Here, performing the encapsulated request may include erasing information in and/or writing information to one or more memory devices contained in firmware storage 140 that provide storage for the code region.

Figure 7:
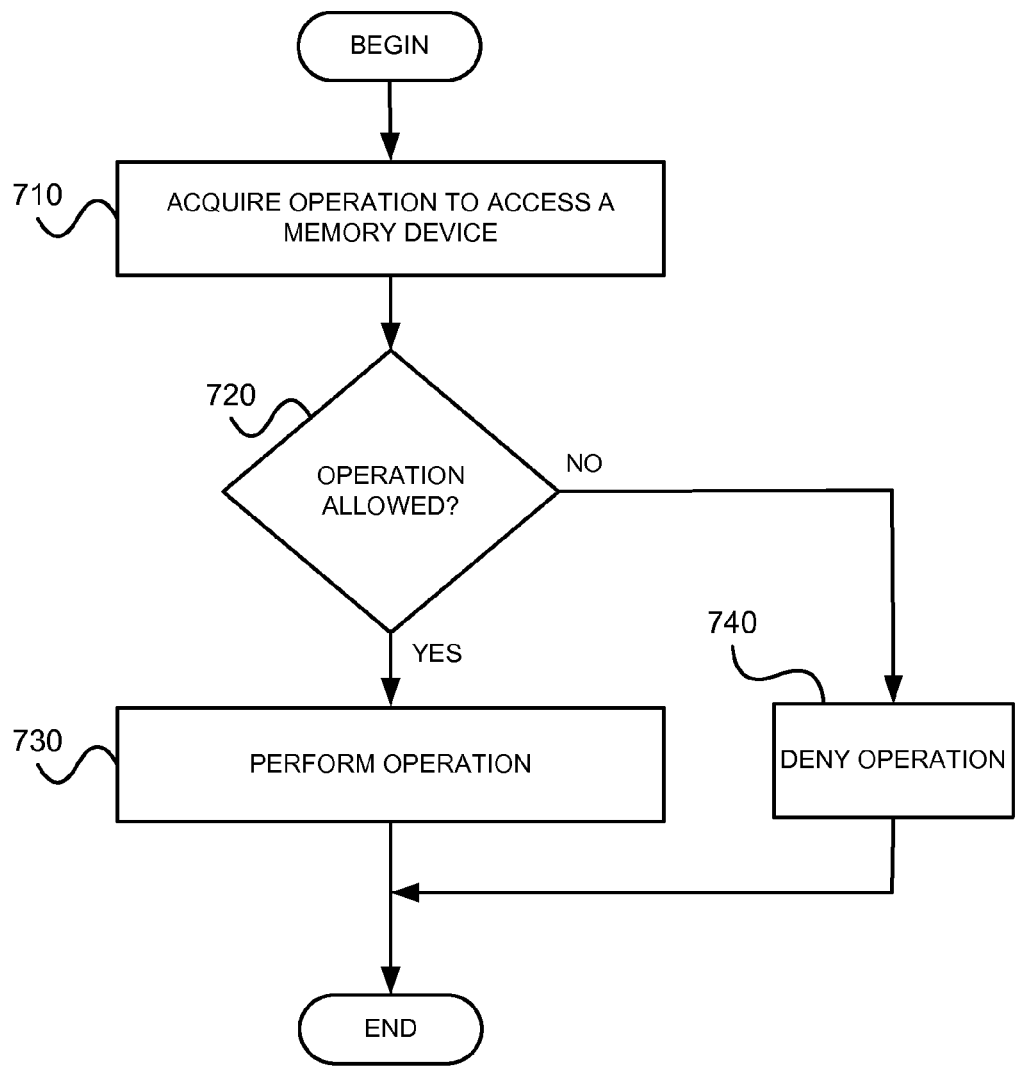
FIG. 7 illustrates a flow diagram of example acts that may be performed to control which operations may be performed on a memory device.

FIG. 7 illustrates a flow diagram of example acts that may be performed to control operations performed on a memory device. The memory device may be contained, for example, in firmware storage 140.

Referring to FIG. 7, at block 710, an operation to access the memory device may be acquired and, at block 720, a check may be performed to determine whether the operation is allowed. If at block 720, it is determined that the operation should be allowed, at block 730, the operation may be performed. If at block 720, it is determined that the operation should not be allowed, at block 740, the operation may be denied. Denying the operation may include, for example, not performing the operation.

For example, suppose APP 304 issues an operation to OS 302 to erase a portion of a memory device that stores data for the data region of firmware storage 140. Secure BIOS 144 may acquire the operation from the OS 302 and perform a check to determine whether the operation should be allowed. Suppose that secure BIOS 144 determines that the operation should be allowed. Secure BIOS 144 may notify the OS 302 that the operation is allowed. In response to being notified that the operation is allowed, the OS 302 may perform the operation. Assuming the operation was successful, OS 302 may return a success status to APP 304.

Now suppose that instead of determining the operation should be allowed, secure BIOS 144 determines that the operation should not be allowed. Secure BIOS 144 may notify the OS 302 that the operation is not allowed. In response to the notification, the OS 302 may deny the operation. Denying the operation may include returning an unsuccessful status to the APP 304.

In addition, error reporting 306 may report the attempt to perform the operation to, for example, anti-malware agent 308. Anti-malware agent 308 may use the report to determine whether a trend is occurring that may indicate that firmware storage 140 may be undergoing a malicious attack. If so, anti-malware agent 308 may notify anti-malware cloud agent 406 via network 402 that anti-malware agent 308 has detected this trend. In response to the notification, anti-malware agent 308 may notify a user associated with server 404 of the detected trend. In response to receiving the notification, the user may take action to contain the malicious attack and/or future malicious attacks. For example, the user may remove an application that may be causing the malicious attack and/or update a signature database that may be used by anti-malware agent 308 to identify malicious attacks. Note that other actions may be performed by the user to contain the malicious attack and/or future malicious attacks.

Figure 8:
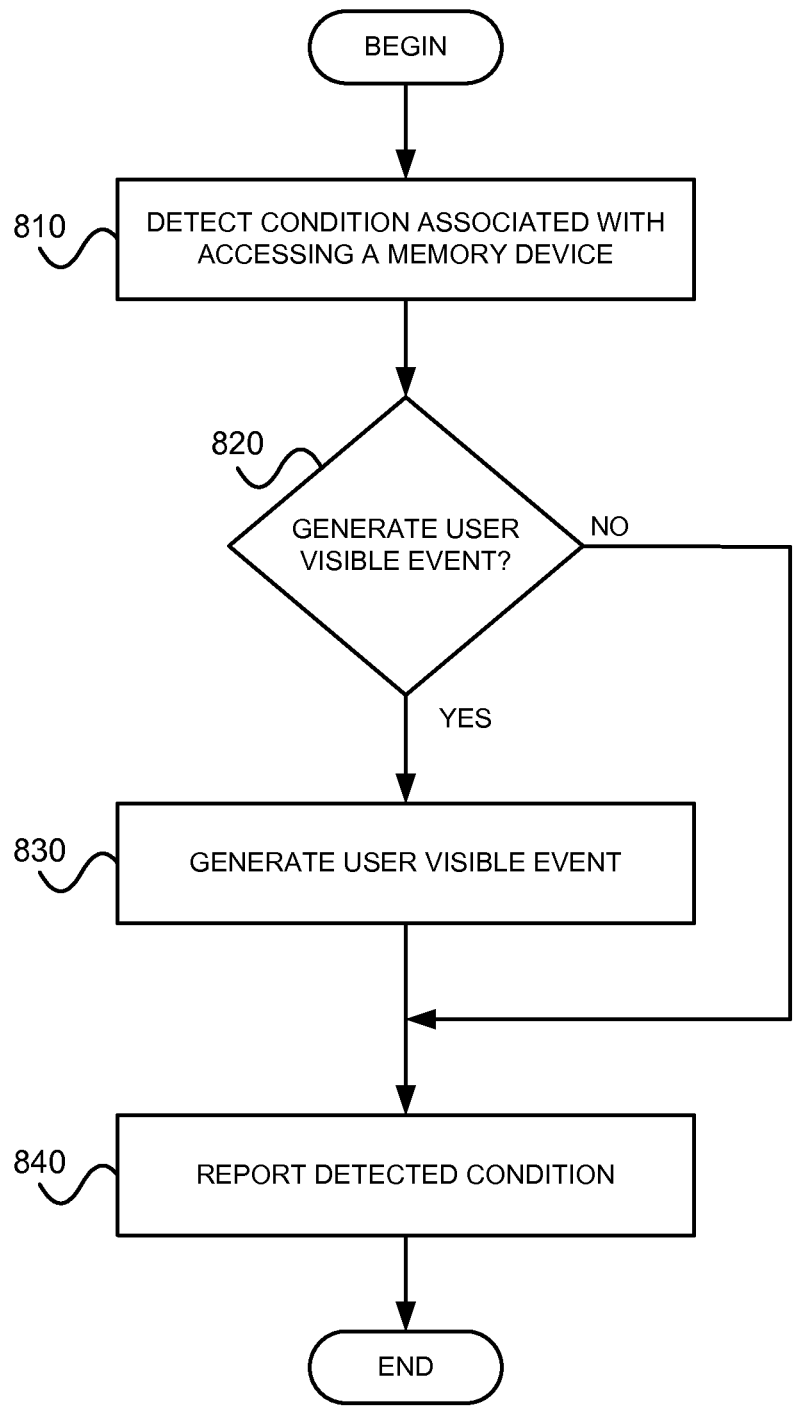
FIG. 8 illustrates a flow diagram of example acts that may be performed to detect and report a condition associated with accessing a memory device.

FIG. 8 illustrates a flow diagram of example acts that may be performed to detect and report a condition associated with accessing a memory device. The memory device may be contained, for example, in firmware storage 140.

Referring to FIG. 8, at block 810, a condition associated with accessing the memory device is detected. For example, suppose the memory device stores computer-executable instructions that are part of the code region of firmware storage 140. Now suppose APP 304 issues a request to OS 302 to attempt to erase a portion of the memory device that stores the computer-executable instructions. OS 302 may notify secure BIOS 144 of the request.

In response to the notification, secure BIOS 144 may detect a condition associated with accessing the memory device. This condition may be detected, for example, by examining the request and determining that an attempt is being made to erase a portion of the memory device.

At block 820, a check may be performed to determine whether a user visible event should be generated. Continuing the above example, suppose that secure BIOS 144 has established a policy where requests to update the code region of firmware storage 140 may only be performed when computing device 100 is booting. Further suppose that the booting the computing device 100 causes a user visible event. After determining an attempt is being made to erase a portion of the memory device, secure BIOS 144 may determine that this detected condition triggers the above policy. Therefore, secure BIOS 144 may determine that a user visible event should be generated in response to the detected condition.

If at block 820, it is determined that a user visible event is to be generated, at block 830, a user visible event may be generated. Continuing the above example, secure BIOS 144 may encapsulate the request for later execution while computing device 100 is booting. Afterwards, OS 302 may boot computing device 100 thereby generating a user visible event. While the computing device 100 is booting, the encapsulated request may be performed such as described above.

At block 840, the detected condition may be reported. Continuing the above example, error reporting 306 may, for example, report the detected condition to anti-malware agent 308 and anti-malware agent 308 may report the detected condition to anti-malware cloud agent 406 such as described above.

Note that at block 820, if a user visible event is not generated, the attempt to access the memory device may, for example, be denied. Denying the attempt may include not allowing the attempt to access the memory device and reporting the attempt to anti-malware agent 308 and/or anti-malware cloud agent 406 such as described above.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5-8, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, techniques described herein may be implemented using computer-executable instructions that may be executed by processing logic such as, for example, processing logic 200. The computer-executable instructions may be stored on one or more non-transitory tangible computer-readable storage media. The media may be volatile or non-volatile and may include, for example, DRAM storage, SRAM storage, and/or flash memory storage.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
   acquiring a request, the request associated with writing information to a memory device or erasing information stored in the memory device, the memory device being contained in a first computing device;
   saving the request for execution by the first computing device after a user visible event has been generated on the first computing device, the user visible event being generated after the first computing device has been reset;
   resetting the first computing device;
   generating the user visible event on the first computing device; and
   executing the saved request after the user visible event has been generated.

2. The method of claim 1, wherein the user visible event includes a reset of the first computing device.

3. The method of claim 1, further comprising:
   reporting the request.

4. The method of claim 3, wherein the request is reported to an anti-malware agent.

5. The method of claim 4, wherein the anti-malware agent is executed by the first computing device.

6. The method of claim 4, wherein the anti-malware agent is executed on a second computing device that communicates with the first computing device.

7. The method of claim 6, wherein the second computing device communicates with the first computing device via a communications network.

8. The method of claim 1, wherein the memory device is contained in a storage that stores computer-executable instructions that are executed by the first computing device when the first computing device is booting.

9. The method of claim 8, wherein the request includes a request to write or erase information in a code region of the storage.

10. The method of claim 8, wherein the request includes a request to write or erase information contained in a data region of the storage.

11. The method of claim 1, wherein the request is acquired by a basic input/output system (BIOS) contained in the first computing device.

12. A computing device comprising:
    a memory device;
    processing logic to:
    acquire a request, the request associated with writing information to the memory device or erasing information stored in the memory device,
    save the request for execution by the computing device after a user visible event has been generated on the computing device, the user visible event being generated after the computing device has been reset,
    reset the computing device,
    generate the user visible event on the computing device, and
    execute the saved request after the user visible event has been generated.

13. The computing device of claim 12, wherein the user visible event includes resetting the computing device.

14. The computing device of claim 12, wherein the processing logic is further to:
    report the request.

15. The computing device of claim 14, wherein the request is reported to an anti-malware agent.

16. The computing device of claim 12, wherein the memory device is contained in a storage that stores computer-executable instructions that are executed by the computing device when the computing device is booting.

17. The computing device of claim 16, wherein the request includes a request to write or erase information in a code region or a data region of the storage.

18. One or more tangible non-transitory computer-readable media storing one or more computer-executable instructions that when executed by processing logic causes the processing logic to:
    acquire a request, the request associated with writing information to a memory device or erasing information stored in the memory device, the memory device being contained in a computing device;
    save the request for execution by the computing device after a user visible event has been generated on the computing device, the user visible event being generated after the computing device has been reset;
    reset the computing device;
    generate the user visible event on the computing device; and
    execute the saved request after the user visible event has been generated.

19. The computer-readable media of claim 18, wherein the user visible event includes a reset of the computing device.

20. The computer-readable media of claim 18, further storing one or more computer-executable instructions that when executed by the processing logic cause the processing logic to:
    report the request.

21. The computer-readable medium of claim 20, wherein the request is reported to an anti-malware agent.

22. The computer-readable medium of claim 18, wherein the memory device is contained in a storage that stores computer-executable instructions that are executed by the computing device when the computing device is booting.

23. The computer-readable medium of claim 22, wherein the request includes a request to write or erase information in a code region or a data region of the storage.

* * * * *